G. HAYES.
Skylight.

No. 8,676. Reissued April 15, 1879.

Witnesses.
Henry Strugnell
George A. Hayes

Inventor
George Hayes.

N. PETERS, PHOTO-LITHOGRAPHER, WASHINGTON, D. C.

UNITED STATES PATENT OFFICE.

GEORGE HAYES, OF NEW YORK, N. Y.

IMPROVEMENT IN SKYLIGHTS.

Specification forming part of Letters Patent No. 143,149, dated September 23, 1873; Reissue No. 8,676, dated April 15, 1879; application filed February 27, 1879.

*To all whom it may concern:*

Be it known that I, GEORGE HAYES, of the city, county, and State of New York, have invented Improvements in Skylights, Conservatories, and other glazed structures, of which the following is a specification.

The invention, though applicable to other glazed structures, is more especially adapted to conservatories built mainly of glass and metal.

I have the same object in view in this invention as I had in former patents granted me, numbered, respectively, 100,143, 106,157, and 112,594, the object being to afford provision for expansion and contraction, so that the parts of the structure will not be unduly strained or broken, and also to facilitate the expeditious erection of such buildings, and afford to them lightness and strength, while lessening their cost.

One part of the invention consists in a novel construction of the bars, wherein I employ angle-pieces with one or more wings or ribs, to afford additional stiffness and strength without increasing the size of the bar so as to obstruct the light unnecessarily.

Another part of the invention consists in a cap-plate of novel construction for securing the panes of glass to the bars.

Figure 2:
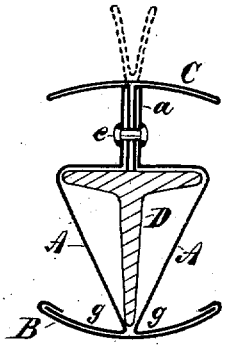
Figure 1:
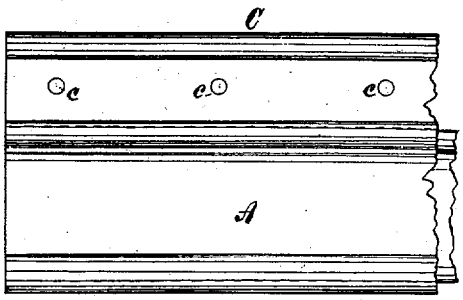
Figure 3:
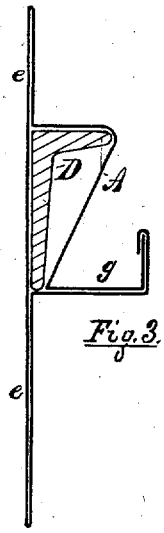

In the accompanying drawings, Figure 1 is a side view of a bar. Fig. 2 is a transverse section, showing outside of sheet metal, and inside the same an angle-piece having two wings or laterally-extending arms or ribs. Fig. 3 is a transverse section similar except the angle-piece having but one arm, wing, or rib, or what may be termed a flange.

Like letters indicate like parts.

A is a hollow bar composed of sheet metal folded or bent to the proper shape, the bottom edges forming gutters *g g*, secured or covered beneath by metal cap B, conforming to the shape of gutter. Gutters, however, may be dispensed with when not needed.

In the bar shown by Fig. 2 the upper edges of the two component parts of the sheet-metal bar or casing are bent upward in juxtaposition to each other, and receive between them the downward-bent edges of the cap-plate C, which secures the panes of glass against the bar. This cap-plate C is formed of sheet metal, bent at the middle for a certain width into convex form, and then bent from the outer confines of this portion toward the middle, whence its edges are bent contiguously in a downward direction, to form a tongue, *a*, which is received between the adjacent bent edges of the bar A.

The cap-plate is secured to the bar by means of rivets *c* passing through its tongue and the bent-up edges of the bar. It is made of lead or other soft metal, so that it may be readily bent to adapt it to varying thicknesses in the glass, or for other purposes.

The aforesaid convex portions of the cap-plate constitute two wing-like parts, which, before the glass is in place, will be bent up, as shown in dotted lines, Fig. 2.

To impart to a hollow bar formed of sheet metal sufficient stiffness and strength to adapt it to construction of conservatories, which may be built almost entirely thereof, I arrange within the bar an angle-bar iron having a straight web and one or more laterally-extending arms or ribs or wings, the arms, ribs, or wings just wide enough to fit snugly within the bar, which is thus rendered very strong, and a very efficient means of carrying and securing glass plates in place is obtained.

In Fig. 2 is shown an angle-piece having two laterally-extending arms, ribs, or wings, in combination with sheet-metal bar or casing forming its inclosure.

In Fig. 3 is shown an angle-piece having but one laterally-extending arm, rib, or wing, also in combination with sheet-metal casing or inclosure.

What I claim as my invention, and desire to secure by Letters Patent, is—

1. The combination of an internal angle-piece having one or more laterally-extending flanges, ribs, or wings with a sheet-metal bar or casing, essentially as and for the purpose described and set forth.

2. The combination, with sheet-metal bar A, of the cap-plate C, of soft metal, and adapted to be bent into position to hold the glass, substantially as and for the purpose specified.

GEORGE HAYES.

Witnesses:

HENRY STRUGNELL,
GEORGE A. HAYES.